United States Patent
Hansen et al.

(10) Patent No.: US 12,297,691 B2
(45) Date of Patent: May 13, 2025

(54) SEAL MECHANISM FOR LOAD PORT DOORS

(71) Applicant: APPLIED MATERIALS, INC., Santa Clara, CA (US)

(72) Inventors: James Christopher Hansen, Mountain View, CA (US); Douglas Brian Baumgarten, Round Rock, TX (US); Paul Benjamin Reuter, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 6 days.

(21) Appl. No.: 18/196,088

(22) Filed: May 11, 2023

(65) Prior Publication Data

US 2024/0376768 A1  Nov. 14, 2024

(51) Int. Cl.
*E06B 7/23* (2006.01)
*F16J 15/02* (2006.01)

(52) U.S. Cl.
CPC .......... *E06B 7/2314* (2013.01); *F16J 15/022* (2013.01)

(58) Field of Classification Search
CPC .......... E06B 7/16; E06B 7/2314; F16J 15/022
See application file for complete search history.

(56) References Cited

U.S. PATENT DOCUMENTS

| | | | | |
|---|---|---|---|---|
| 3,031,200 A | * | 4/1962 | Hamer | F16J 15/32 277/928 |
| 3,048,415 A | * | 8/1962 | Shook | F16L 21/035 277/625 |
| 4,233,780 A | * | 11/1980 | Royce | E06B 7/16 49/489.1 |
| 4,617,220 A | * | 10/1986 | Ginster | E06B 7/2309 428/3 |
| 5,580,068 A | * | 12/1996 | Gundy | F16J 15/022 277/615 |
| 6,523,833 B1 | * | 2/2003 | Ishigaki | F16J 15/062 277/551 |
| 7,282,097 B2 | * | 10/2007 | Tanase | H01L 21/67126 156/345.31 |
| 8,181,972 B2 | * | 5/2012 | Tsuji | F16K 51/02 277/644 |

(Continued)

FOREIGN PATENT DOCUMENTS

WO   2017169847 A1   10/2017

OTHER PUBLICATIONS

International Search Report and Written Opinion for International Application No. PCT/US2024/010656, mailed Apr. 30, 2024, 09 Pages.

*Primary Examiner* — Eugene G Byrd
(74) *Attorney, Agent, or Firm* — Lowenstein Sandler LLP

(57) ABSTRACT

The disclosure describes devices and systems for a seal, and methods for using said seal. A seal includes a base portion configured to couple to a groove formed by a first surface of a first component. The base portion includes a notch in a bottom side of the base portion configured to cause the base portion to laterally flex responsive to an installation force. The seal further includes a sealing portion extending from the base portion. The sealing portion is configured to create an airtight seal between the first component and a sealing surface of a second component responsive to an application of a threshold sealing force against the sealing portion.

20 Claims, 8 Drawing Sheets

(56) References Cited

U.S. PATENT DOCUMENTS

| | | | |
|---|---|---|---|
| 9,724,987 B2 * | 8/2017 | Inai | B60J 10/27 |
| 11,359,722 B2 * | 6/2022 | Maheshwari | F16J 15/064 |
| 2010/0001521 A1 * | 1/2010 | Vandal | B23P 19/04 |
| | | | 285/337 |
| 2015/0028581 A1 * | 1/2015 | Raible | F16L 17/035 |
| | | | 277/626 |
| 2016/0215884 A1 * | 7/2016 | Hettle | F16J 15/022 |
| 2016/0312933 A1 * | 10/2016 | Vreeken | F16L 25/0054 |
| 2017/0328473 A1 * | 11/2017 | Kim | F16J 15/02 |
| 2018/0051811 A1 * | 2/2018 | White | F16K 1/465 |
| 2018/0102266 A1 * | 4/2018 | Kunsch | H01L 21/67126 |
| 2018/0130686 A1 | 5/2018 | Blahnik et al. | |
| 2018/0130687 A1 | 5/2018 | Bonecutter | |
| 2019/0252228 A1 | 8/2019 | Ochiai et al. | |
| 2020/0141494 A1 * | 5/2020 | Sakaguchi | H05K 7/20272 |
| 2020/0158241 A1 * | 5/2020 | Mazzaro | F16J 15/3284 |
| 2020/0208635 A1 * | 7/2020 | Shinoda | F04C 27/008 |
| 2022/0010901 A1 * | 1/2022 | Hovmand | F16L 23/16 |
| 2022/0090682 A1 * | 3/2022 | Cox | F16J 15/028 |
| 2024/0003181 A1 * | 1/2024 | Hansen | H01L 21/67155 |
| 2024/0068569 A1 * | 2/2024 | Treier | F16J 15/123 |

\* cited by examiner

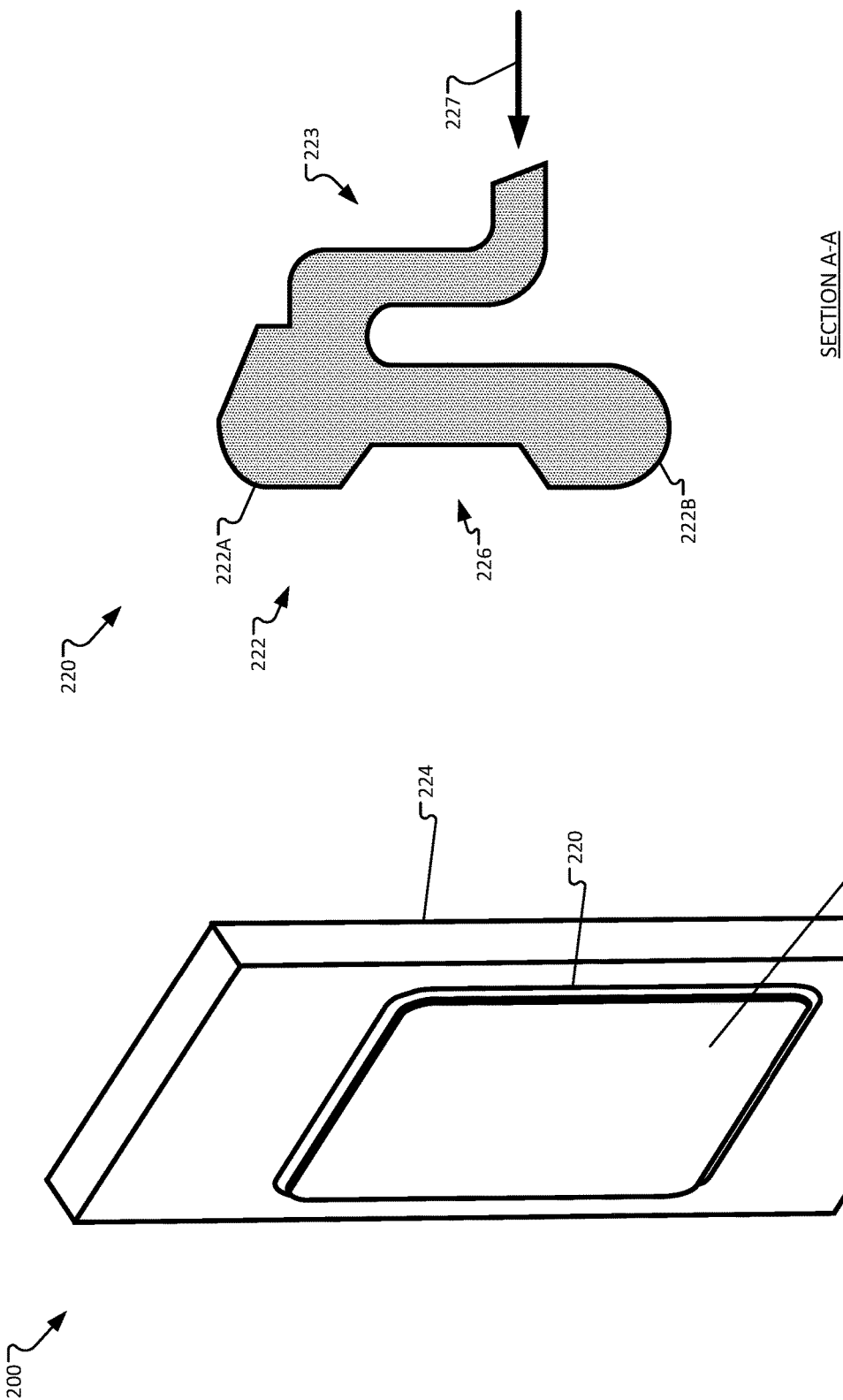

SEAL MECHANISM FOR LOAD PORT DOORS

TECHNICAL FIELD

Embodiments of the present disclosure relate, in general, to seal mechanisms for a load port door.

BACKGROUND

An electronic device manufacturing system can include one or more tools or components for transporting and manufacturing substrates. Such tools or components can include a factory interface (e.g., an equipment front-end module (EFEM)) connected to a load lock and/or transfer chamber. In some instances, the front face of the factory interface can include one or more load ports. A load port is a station for the input and output of substrate carriers. The load port can include a frame adapted to connect the load port to a factory interface. The frame can include a transport opening through which one or more substrates are capable of being transported between the substrate carrier and the factory interface.

Current load ports generally don't include seals between the frame of the load port and a load port door. However, such a configuration can be inefficient because current systems do not maintain the environmentally-controlled atmosphere between the frame and the door.

SUMMARY

Some of the embodiments described herein cover a seal including a base portion configured to couple to a groove formed by first surface of a first component. The base portion includes a notch in a bottom of the base portion configured to cause the base portion to laterally flex responsive to an installation force. The seal further includes a sealing portion extending from the base portion. The sealing portion is configured to create an airtight seal between the first component and a sealing surface of a second component responsive to an application of a threshold sealing force against the sealing portion.

Some of the embodiments described herein cover a load port door. The load port door includes an exterior surface and an interior surface. A groove is formed in the interior surface. The load port door further includes a seal. The seal includes a base portion configured to couple to the groove. The base portion includes a notch in a bottom of the base portion configured to cause the base portion to laterally flex responsive to an installation force. The seal further includes a sealing portion extending from the base portion. The sealing portion is configured to create an airtight seal between the load port door and a sealing surface of a frame of a load port responsive to an application of a threshold sealing force against the sealing portion.

Some of the embodiments described herein cover a load port for receiving a substrate carrier. Some of the embodiments described cover a load port for receiving a substrate carrier. The load port includes a frame adapted for connecting the load port to a factory interface. The frame includes a transport opening through which one or more substrates are transportable between the substrate carrier and the factory interface. The load port further includes a load port door configured to substantially fill the transport opening. The load port door includes a first surface forming a groove. The load port further includes a seal coupled to the groove formed in the first surface of the load port door. The seal includes a base portion and a sealing portion extending from the base portion. The seal is coupled to the groove of the load port door via the base portion. The base portion includes a notch in a bottom of the base portion configured to cause the base portion to laterally flex responsive to an installation force. The sealing portion is configured to create an airtight seal between the load port door and a sealing surface of the frame responsive to an application of a threshold sealing force against the sealing portion.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 2B is a perspective view of an example load port frame and seal assembly, according to aspects of the present disclosure.

FIG. 2C is a cross section view of an example seal assembly, according to aspects of the present disclosure.

DETAILED DESCRIPTION OF EMBODIMENTS

Figure 1A:
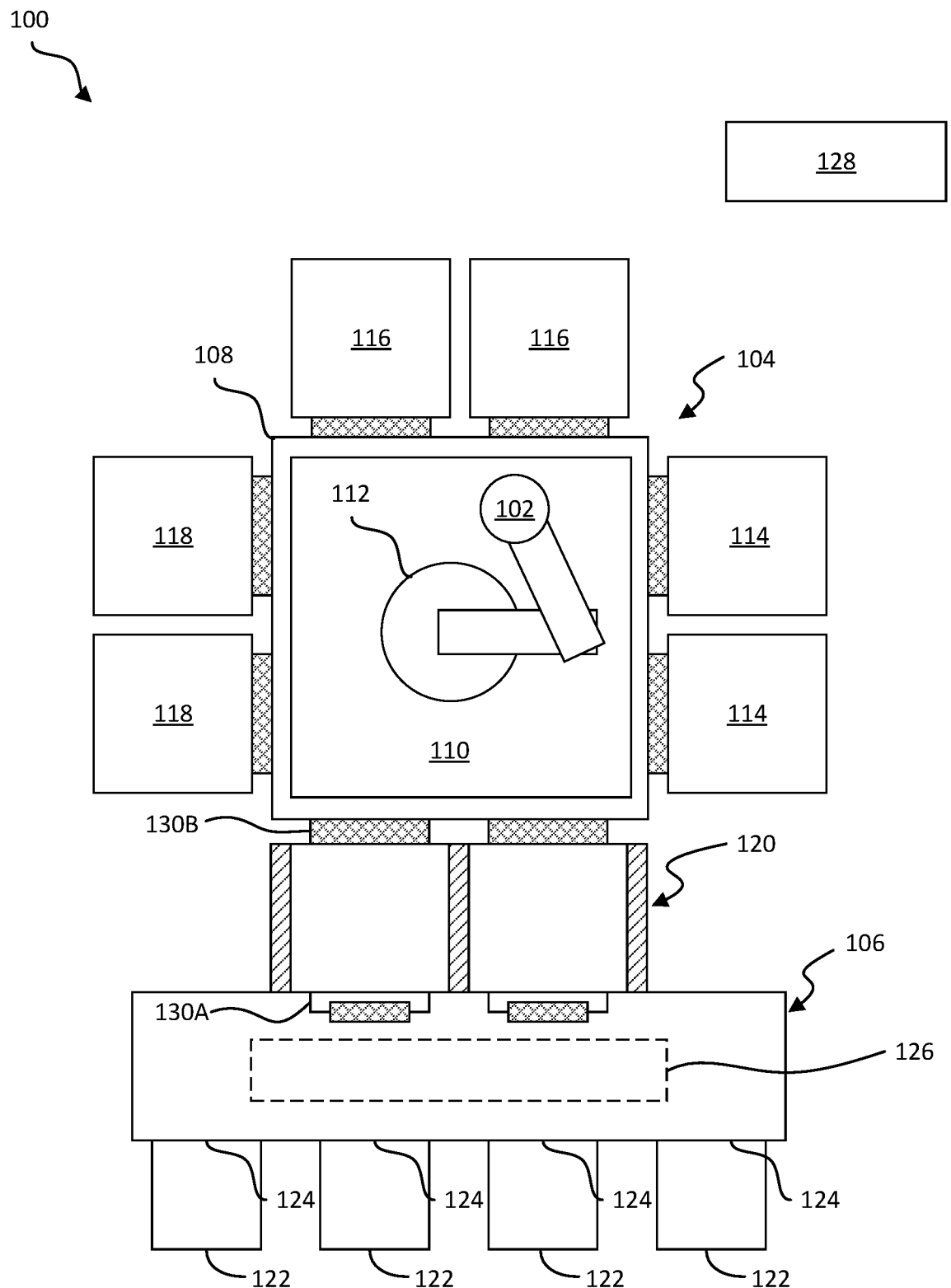
FIG. 1A is a top schematic view of an example electronic device manufacturing system, according to aspects of the present disclosure.

Embodiments described herein cover systems and methods related to seals for load ports. Some embodiments are directed to a seal configured to couple to a load port door. Some embodiments are directed to a load port door having a seal. Some embodiments are directed to a load port including a door having a seal. Other embodiments are directed to seals that can be used for other components of a processing system, such as seals for side storage pods (SSPs), front opening unified pods (FOUPs), and so on. It should be understood that embodiments described herein with regards to seals for load port doors also apply to seals used for any other component, chamber or device in a manufacturing system (e.g., in a semiconductor manufacturing system). In some embodiments, the seals described herein can be used instead of traditional o-rings (e.g., in o-ring grooves formed in load port doors, load port frames, FOUPS, SSPs, and/or other chambers, components and/or modules of equipment for processing of devices such as semiconductor devices and/or displays).

Many conventional load ports do not include a seal between an interface of the load port door and the load port frame. Thus, conventional systems often have leakage around the load port door. A positive pressure can be maintained inside a factory interface (e.g., an EFEM) chamber coupled to the load port so that contaminants are not introduced through the interface between the load port door and the load port frame. However, leaking gas can increase a cost of use for a factory interface if such a positive pressure is maintained. Additionally, the leaking gas through the conventionally unsealed interface with a load port door can cause corrosion at the interface which may lead to particle generation. The particles generated can be introduced into both a substrate carrier (e.g., a FOUP) and the factory interface, contaminating the conventional system. Further, leaking gas may pose a safety hazard. For example, leaking N2 gas may cause an asphyxiation hazard in the environment outside the EFEM (e.g., in the facility).

Some conventional load ports can include a traditional o-ring seal (e.g., with a substantially circular cross section) between the load port door and the load port frame. However, these traditional o-ring seals often rely on large forces to create an airtight seal. Often, a load port door actuator cannot provide the large forces relied upon by traditional o-ring seals. As an example, where traditional o-ring seals are used the load port door actuator is to push the load port door against the load port frame such that an o-ring seal disposed between the load port door and the load port frame is sufficiently compressed to create an airtight seal. Including a load port door actuator that can provide sufficient forces for sealing using traditional o-ring seals may contribute to extra expense and weight of the system. To reduce the force necessary for sealing, some conventional load ports include a hollow o-ring to seal between the load port door and the load port frame. However, hollow o-rings can often become unseated from an o-ring groove (e.g., a dovetail groove, a groove in which the o-ring is to sit, etc.), causing the seal to fail. Further, conventional hollow o-rings may stick to the sealing surface of the load port frame (causing the o-ring to become unseated from the groove when the load port door opens). The sticking of conventional o-rings to the load port frame can cause particle generation when the o-ring un-sticks.

Some other conventional seals may be difficult to install in a traditional o-ring groove (e.g., a dovetail groove, etc.). For example, the throat of a traditional o-ring groove is narrower than the base of the groove. To install a seal into the groove, a portion of the seal is bent so that the portion can fit through the groove throat. Often, because of the material that the seal is made of, bending the seal is difficult, necessitating the use of excessive force and increasing the difficulty to install the seal.

In some embodiments of this disclosure, a load port includes a frame adapted to connect the load port to a factory interface. The frame includes a transport opening through which one or more substrates can be transported between a substrate carrier and the factory interface. The load port includes a load port door on the factory interface side of the frame to substantially fill the transport opening when the door is in a closed position. The load port door is coupled to a door mechanism (e.g., an actuator operated by a load port controller). The door mechanism can position the load port door from a closed position to an open position, and vice versa.

The load port door includes a seal having a base portion and a sealing portion. The seal is configured to couple to a groove of the load port door via the base portion. The groove may be formed by a planar surface of the load port door and may extend around a perimeter of the load port door. The base portion may include a notch in the bottom. The notch may be configured to cause the base portion to laterally flex when the base portion is inserted into the groove (e.g., when the seal is installed). The sealing portion of the seal may extend from the base portion. The sealing portion may create an airtight seal against a sealing surface of the load port frame when the door is closed (e.g., by the door mechanism). The sealing portion may create the seal responsive to a force being applied against the sealing portion.

By providing the seal of the present disclosure, many advances can be realized. For example, the seal of the present disclosure can result in a smaller sealing force to create an airtight seal between the load port door and the load port frame than a sealing force that is used for traditional o-ring seals, reducing the force requirements of the door actuator and allowing the load port frame to be constructed of cheaper materials such as sheet metal. Additionally, the seal of the present disclosure reduces leakage present in conventional systems by sealing the interface between the load port door and the load port frame, thus reducing material consumption (e.g., gas, etc.) and reducing the amount of contaminants that leak out around the load port door when compared to conventional systems. The contaminants may remain in the system and can be exhausted away properly. Furthermore, the seal described allows for easier installation into conventional grooves because of the notch in the bottom of the base portion that allows the base portion to flex as the base portion is pushed through the throat of the groove, thus making the seal easier to install while still retaining the seal in the groove of the load port door.

Figure 1B:
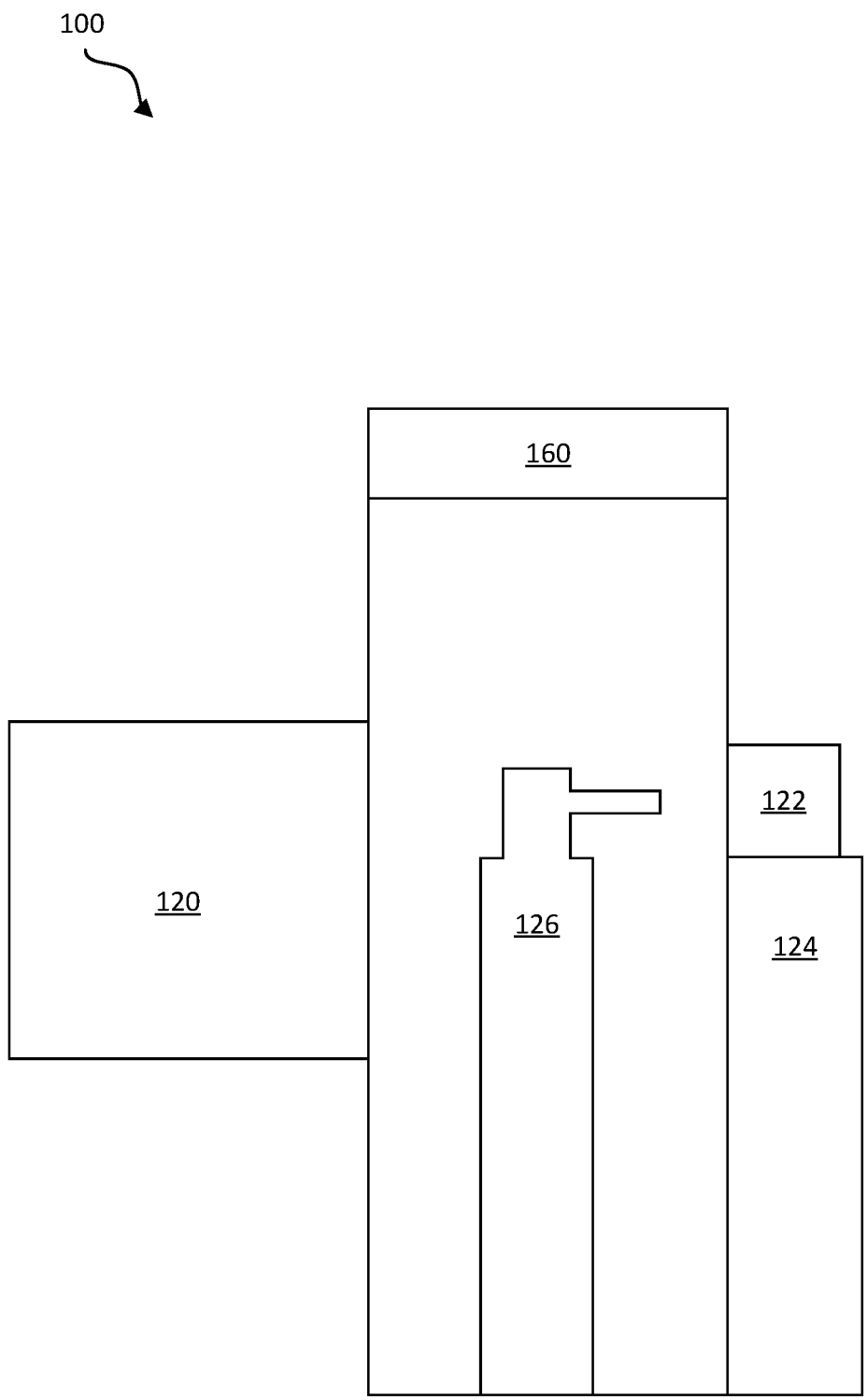
FIG. 1B is a side schematic view of an example electronic device manufacturing system, according to aspects of the present disclosure.
Figure 1C:
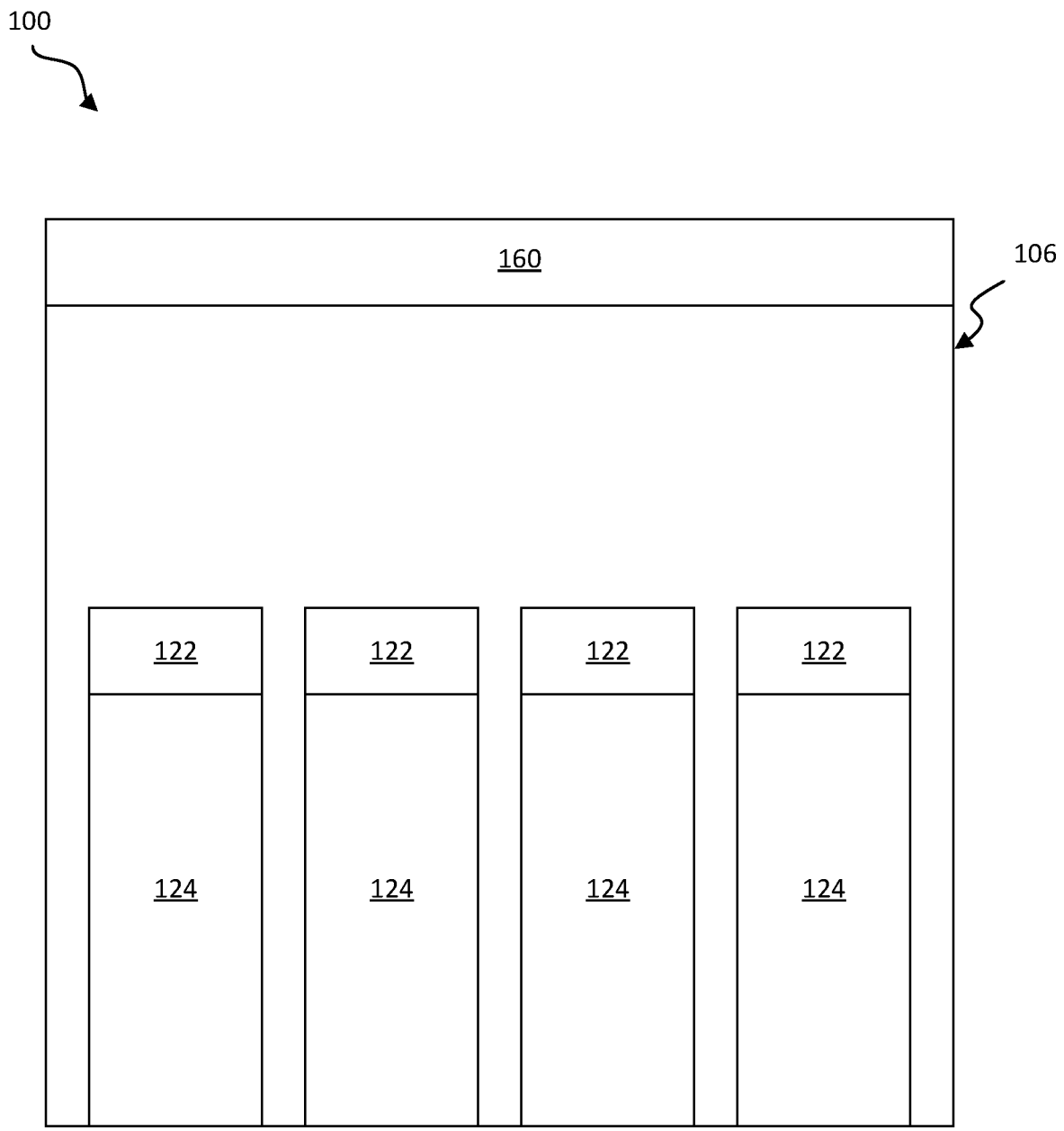
FIG. 1C is a front schematic view of an example electronic device manufacturing system, according to aspects of the present disclosure.

FIGS. 1A-1C describe an electronic device manufacturing system 100 where one or more load ports are coupled to a factory interface 106. FIG. 1A is a top schematic view of the example electronic device manufacturing system 100, according to aspects of the present disclosure. FIG. 1B is a side schematic view of the example electronic device manufacturing system 100, according to aspects of the present disclosure. FIG. 1C is a front schematic view of the example electronic device manufacturing system 100, according to aspects of the present disclosure. It is noted that FIGS. 1A-1C are used for illustrative purposes, and that different component can be positioned in different location in relation to each view.

Electronic device manufacturing system 100 (also referred to as an electronics processing system) is configured to perform one or more processes on a substrate 102. Substrate 102 can be any suitably rigid, fixed-dimension, planar article, such as, e.g., a silicon-containing disc or wafer, a patterned wafer, a glass plate, or the like, suitable for fabricating electronic devices or circuit components thereon.

Electronic device manufacturing system 100 includes a process tool (e.g., a mainframe) 104 and a factory interface 106 (e.g., an EFEM) coupled to process tool 104. Process tool 104 includes a housing 108 having a transfer chamber 110 therein. Transfer chamber 110 includes one or more processing chambers (also referred to as process chambers) 114, 116, 118 disposed therearound and coupled thereto. Processing chambers 114, 116, 118 can be coupled to transfer chamber 110 through respective ports, such as slit valves or the like.

Processing chambers 114, 116, 118 can be adapted to carry out any number of processes on substrates 102. A same or different substrate process can take place in each processing chamber 114, 116, 118. Examples of substrate processes include atomic layer deposition (ALD), physical vapor deposition (PVD), chemical vapor deposition (CVD), etching, annealing, curing, pre-cleaning, metal or metal oxide removal, or the like. In one example, a PVD process is performed in one or both of process chambers 114, an etching process is performed in one or both of process chambers 116, and an annealing process is performed in one or both of process chambers 118. Other processes can be carried out on substrates therein. Processing chambers 114, 116, 118 can each include a substrate support assembly. The substrate support assembly can be configured to hold a substrate in place while a substrate process is performed.

Transfer chamber 110 also includes a transfer chamber robot 112. Transfer chamber robot 112 can include one or multiple arms where each arm includes one or more end effectors at the end of each arm. The end effector can be configured to handle particular objects, such as wafers. Alternatively, or additionally, the end effector is configured to handle objects such as process kit rings. In some embodiments, transfer chamber robot 112 is a selective compliance assembly robot arm (SCARA) robot, such as a 2-link SCARA robot, a 3-link SCARA robot, a 4-link SCARA robot, and so on.

A load lock 120 can also be coupled to housing 108 and transfer chamber 110. Load lock 120 can be configured to interface with, and be coupled to, transfer chamber 110 on one side and factory interface 106 on another side. Load lock 120 can have an environmentally-controlled atmosphere that is changed from a vacuum environment (where substrates are transferred to and from transfer chamber 110) to an at or near atmospheric-pressure inert-gas environment (where substrates are transferred to and from factory interface 106) in some embodiments. In some embodiments, load lock 120 is a stacked load lock having a pair of upper interior chambers and a pair of lower interior chambers that are located at different vertical levels (e.g., one above another). In some embodiments, the pair of upper interior chambers are configured to receive processed substrates from transfer chamber 110 for removal from process tool 104, while the pair of lower interior chambers are configured to receive substrates from factory interface 106 for processing in process tool 104. In some embodiments, load lock 120 is configured to perform a substrate process (e.g., an etch or a pre-clean) on one or more substrates 102 received therein.

Factory interface 106 can be any suitable enclosure, such as, e.g., an Equipment Front End Module (EFEM). Factory interface 106 can be configured to receive substrates 102 from substrate carriers 122 (e.g., Front Opening Unified Pods (FOUPs)) docked at various load ports 124 of factory interface 106. A factory interface robot 126 (shown dotted) can be configured to transfer substrates 102 between substrate carriers (also referred to as containers) 122 and load lock 120. In other and/or similar embodiments, factory interface 106 is configured to receive replacement parts from replacement parts storage containers. Factory interface robot 126 can include one or more robot arms and can be or include a SCARA robot. In some embodiments, factory interface robot 126 has more links and/or more degrees of freedom than transfer chamber robot 112. Factory interface robot 126 can include an end effector on an end of each robot arm. The end effector can be configured to pick up and handle specific objects, such as wafers. Alternatively, or additionally, the end effector can be configured to handle objects such as process kit rings. Any conventional robot type can be used for factory interface robot 126. Transfers can be carried out in any order or direction. Factory interface 106 can be maintained in, e.g., a slightly positive-pressure non-reactive gas environment (using, e.g., nitrogen, other inert gasses, or air with controlled sub-component parameters as the non-reactive gas) in some embodiments.

Factory interface 106 can be configured with any number of load ports 124, which can be located at one or more sides of the factory interface 106 and at the same or different elevations. One or more load ports 124 can include a load port door of a design that includes a seal having a base portion and a sealing portion as described herein. The seal and load port of such design will be discussed in greater detail with respect to FIGS. 2A-2C, 3, and 4.

Factory interface 106 can include one or more auxiliary components (not shown). The auxiliary components can include substrate storage containers, metrology equipment, servers, air conditioning units, etc. A substrate storage container can store substrates and/or substrate carriers (e.g., FOUPs), for example. Metrology equipment can be used to determine property data of the products that were produced by the electronic device manufacturing system 100. In some embodiments, factory interface 106 can include upper compartment 160, as seen in FIGS. 1B-1C. Upper compartment 160 can house electronic systems (e.g., servers, air conditioning units, etc.), utility cables, system controller 128, or other components.

In some embodiments, transfer chamber 110, process chambers 114, 116, and 118, and/or load lock 120 are maintained at a vacuum level. Electronics processing system 100 can include one or more vacuum ports that are coupled to one or more stations of electronic device manufacturing system 100. For example, first vacuum ports 130a can couple factory interface 106 to load locks 120. Second vacuum ports 130b can be coupled to load locks 120 and disposed between load locks 120 and transfer chamber 110.

Electronic device manufacturing system 100 can also include a system controller 128. System controller 128 can be and/or include a computing device such as a personal computer, a server computer, a programmable logic controller (PLC), a microcontroller, and so on. System controller 128 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 128 can include a data storage device (e.g., one or more disk drives and/or solid state drives), a main memory, a static memory, a network interface, and/or other components. System controller 128 can execute instructions to perform any one or more of the methodologies and/or embodiments described herein. The instructions can be stored on a computer readable storage medium, which can include the main memory, static memory, secondary storage and/or processing device (during execution of the instructions). System controller 128 can include an environmental controller configured to control an environment (e.g., pressure, moisture level, vacuum level, etc.) within factory interface 106. In embodiments, execution of the instructions by system controller 128 causes system controller to perform the methods of one or more of FIG. 5. System controller 128 can also be configured to permit entry and display of data, operating commands, and the like by a human operator.

Figure 2A:
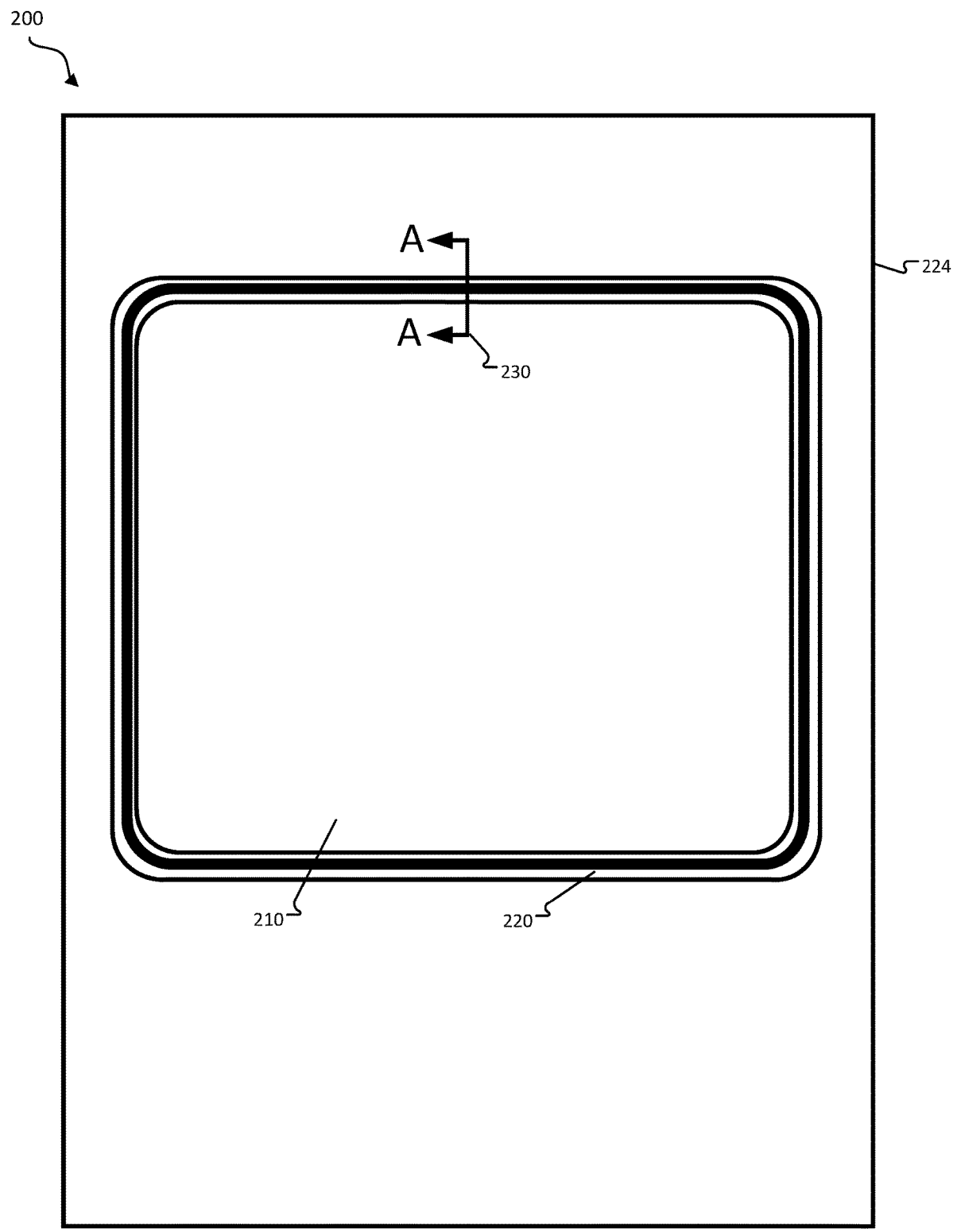
FIG. 2A is a front schematic view of an example load port frame and seal assembly, according to aspects of the present disclosure.

FIGS. 2A-2C illustrate an example load port and seal assembly 200, in accordance with embodiments of the present disclosure. FIG. 2A is a front schematic view of load port and seal assembly 200, in accordance with embodiments of the present disclosure. FIG. 2B is a perspective view of load port and seal assembly 200, in accordance with embodiments of the present disclosure. FIG. 2C is a cross section view of seal 220 as indicated by section A-A 230. In some embodiments, the exterior of the load port frame 224 (or any other load port frame discussed herein) can comply with SEMI (Semiconductor Equipment and Materials International) standards and requirements.

A load port door 210 can be positioned in a closed position to secure to a transport opening to maintain an environmentally-controlled atmosphere in the factory interface 106. The load port door 210 can be positioned in an open position using a door mechanism. While in the open position, the transport opening in the assembly 200 enables substrates (e.g., wafers) to be transferred between a substrate carrier 122 coupled to the load port 124 and factory interface 106 using factory interface robot 126.

Seal 220 can be positioned around the load port door 210. In some embodiments, the geometry of the seal is such that a base portion 222 of the seal couples to the load port door 210 and a surface of the sealing portion 223 extending from the base portion 222 contacts the surface (e.g., the sealing surface) of the load port frame 224 (responsive to the load port door being in the closed position). In some embodiments, the sealing portion 223 extends from the base portion 222 on a side of the base portion 222 opposite a notch 226. In some embodiments, the sealing portion 223 may cantilever from the base portion 222. The seal 220 may create an airtight seal when the load port door 210 is in a closed position. In some examples, a surface of the sealing portion 223 proximate a distal end of the seal 220 engages with a sealing surface of the load port frame 224 to create an airtight seal. The base portion 222 may form a seal against the load port door 210. The load port door 210 may exert a force (e.g., a threshold sealing force) on the seal 220 and the load port frame 224 may exert a reaction force 227 on the distal end of the sealing portion 223 when the load port door 210 is in a closed position. In some embodiments, the load port door 210 moves to the closed position when the force is applied (e.g., by the door actuator). In some embodiments, the force (e.g., load) that is applied to the seal 220 during sealing (e.g., when the door is closed) is perpendicular to a surface at which the seal connects to the load port door (e.g., as shown in FIG. 2C).

In some embodiments, seal 220 is a single piece of material, such as, for example, vulcanized rubber or any other type of elastomer. Seal 220 may be composed of a flexible elastomer material. In some embodiments, seal 220 is made up of a fluorinated, carbon-based synthetic rubber (e.g., a fluoroelastomer, FKM, FFKM, etc.). Those skilled in the art would understand that other suitable materials can be used, such as, for example, natural rubbers, silicone, plastics, other synthetic rubbers, polymers, expanded foam, etc. In some embodiments, seal 220 can be composed of multiple components coupled together. In some examples, the base portion 222 may be composed of a first material and the sealing portion 223 may be composed of a second material and may be bonded and/or coupled to the base portion 222. In some embodiments, at least a portion of the seal 220 is composed of a plastic material. In some embodiments, seal 220 is extruded or molded.

In some embodiments, the base portion 222 of the seal 220 includes a notch 226 formed in the cross section of the base portion 222. The notch 226 may cause the base portion 222 to flex when a bending moment is introduced to the base portion 222 (e.g., such as when installing the base portion 222 into a groove such as the groove shown in FIGS. 3 and 4 or when a sealing force is applied to sealing portion 223). In some embodiments, an installation force (e.g., such as that from a tool used to install the seal 220 on a load port door) causes the base portion 222 to flex because of the notch 226. In some embodiments, the notch 226 causes the base portion 222 to laterally flex about an axis into and out of the page (as shown in FIG. 2C) when an installation force is applied. In some embodiments, the base portion 222 is installed into a groove by first installing the toe 222B of the base portion 222 into the groove. The heel 222A of the base portion 222 is then inserted into the groove by flexing the base portion 222. Pulling on the sealing portion 223 may fully seat the base portion 222 into the groove.

Figure 3:
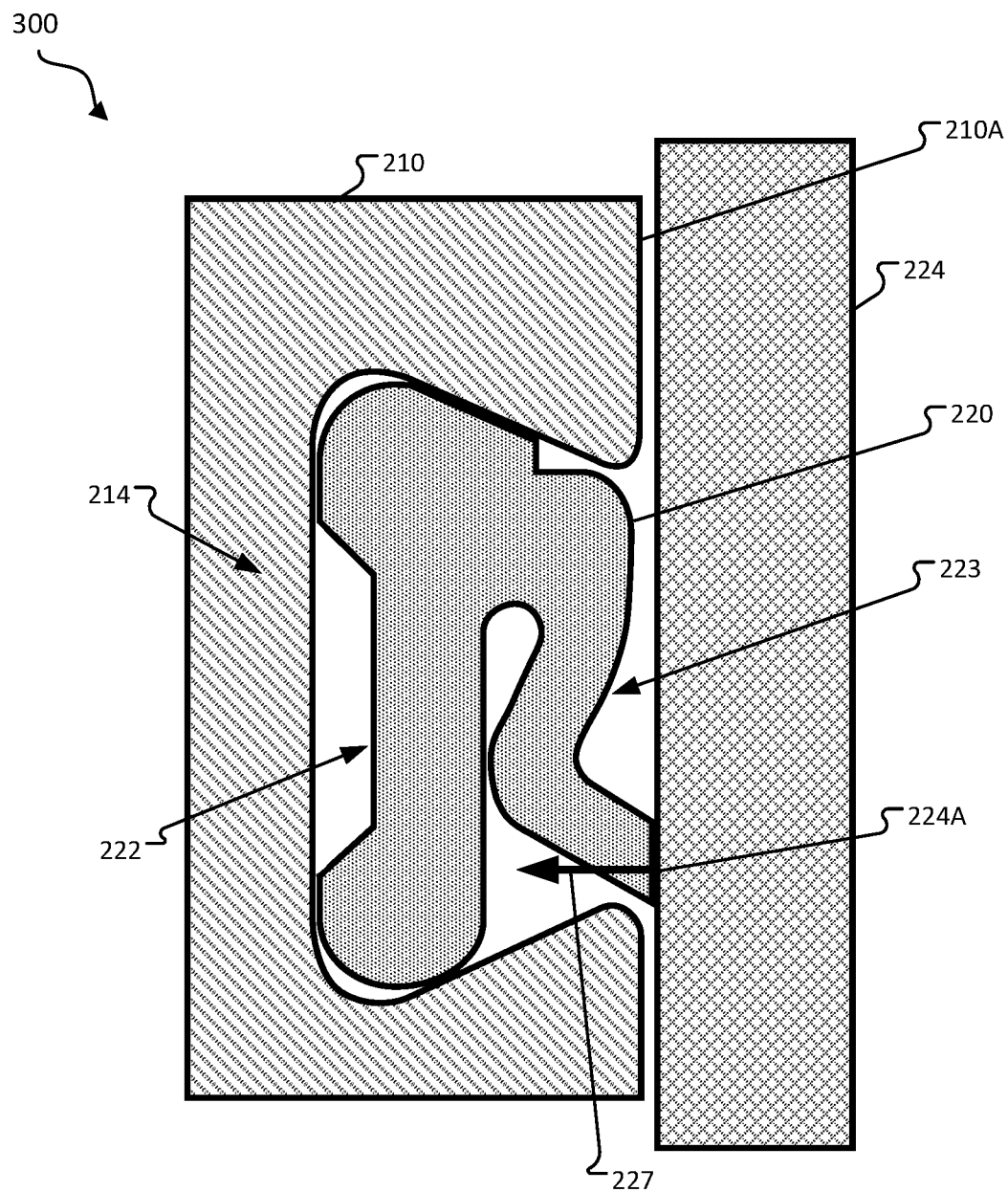
FIG. 3 is a cross section view of an example load port frame and seal assembly, according to aspects of the present disclosure.

In some embodiments, the notch 226 can have an irregular shape, a semi-circular shape, a substantially trapezoidal shape (as shown in FIGS. 2C and 3), etc. The notch 226 can be biased toward the toe 222B of the base portion 222 (e.g., downward as illustrated in FIG. 2C) or can be biased toward the heel 222A of the base portion 222 (e.g., upward as illustrated in FIG. 2C). In some embodiments, the notch 226 is substantially centered between the toe 222B and the heel 222A of the base portion 222. In some embodiments, the width of the notch 226 is proportional to the depth of the notch 226. In some embodiments, the width and/or depth of the notch 226 is proportional to the length and/or width of the base portion 222. In some embodiments, the depth of the notch 226 is between approximately 20% and 40% of the width of the base portion 222. In some embodiments, the depth of the notch 226 is between approximately 30% and 35% of the width of the base portion 222. In some embodiments, the width of the notch 226 is between approximately 20% and 60% of the length of the base portion 222. In some embodiments, the width of the notch 226 is between approximately 30% and 50% of the length of the base portion 222.

In some embodiments, the sealing portion 223 extends from the base portion 222 proximate a heel 222A of the base portion 222. In some embodiments, the sealing portion 223 is cantilevered from the base portion 222 (e.g., cantilevered at the heal of the base portion 222). The sealing portion 223 may include a curved cross-section. In some embodiments, the sealing portion 223 includes a serpentine cross-section (e.g., a semi-serpentine cross-section, etc.). In some embodiments, the cross-section of the seal portion 223 extends from the heal of the base portion 222 and curves to substantially parallel the base portion 222. The tip of the seal portion 223 may curve away from the base portion 222. In some embodiments, the seal portion 223 includes a slanted tip. The slanted tip may interface with a sealing surface (e.g., the sealing surface of a load port frame) to create an airtight seal. In some embodiments, the slanted tip sits flat on the sealing surface when the sealing force (e.g., reaction force 227) is applied to the tip (e.g., see FIG. 3). In some embodiments, the sealing portion 223 flexes when a sealing force is applied. In some embodiments, because of the notch 226, the base portion 222 may flex when the sealing force is applied to the sealing portion 223 to create the airtight seal. In some embodiments, the flexing of the sealing portion 223 and/or of the base portion 222 reduces the sealing force to create the airtight seal.

In some embodiments, the seal 220 may have a total height of between approximately 3 mm and 6 mm. The base portion 222 may have a height of between approximately 1.5 mm and 2.5 mm. In some embodiments, the sealing portion 223 may have a width of between approximately 1 mm and 2 mm. The sealing portion 223 may become gradually thinner at distances away from the base portion 222. In many embodiments, the base portion 222 is configured to fit into a conventional groove (e.g., a dovetail groove, a slotted groove, a square groove, etc.). Surfaces of the base portion 222 may have a radius to fit into a dovetail groove. In some embodiments, the base portion 222 may be configured to substantially fill a groove, but not completely fill the groove (e.g., see FIG. 3). The base portion 222 may include radiused corners. The base portion 222 may have a width of between approximately 2.5 and 4 mm. It is to be understood by a person of ordinary skill in the art that the seal 220 may have differing dimensions than described herein to fit certain applications.

FIG. 3 illustrates a cross-section view of an example load port frame and seal assembly 300, according to aspects of the present disclosure. The assembly 300 includes a first component (e.g., load port door 210), seal 220, and a second component (e.g., load port frame 224). As shown, load port door 210 is in a closed position with seal 220 creating an airtight seal between a sealing surface 224A of load port frame 224 and a surface 210A of the load port door 210.

In some embodiments, the surface 210A is an interior surface of load port door 210. In some embodiments, the surface 210A may be substantially parallel to the sealing surface 224A. The load port door 210 may be moveable relative to the load port frame 224. A door actuator (not illustrated) may move the load port door 210 between a closed position and an open position. The load port door 210 may be illustrated in a closed position. In some embodiments, while in a closed position, the sealing surface 210A may be between approximately 0.1 and 1.0 mm away from the load port frame 224. In some embodiments, the sealing surface 210A is between approximately 0.2 mm and 0.5 mm away from the load port frame 224. To move to an open position, the load port door 210 may move away from the load port frame 224 to the left (as illustrated) and then down (as illustrated) to clear the transport opening. The load port door 210 may move to a closed position responsive to application of an applied force by the actuator on the load port door 210. The sealing portion 223 of the seal 220 may push against the load port frame 224 responsive to the load port door 210 moving to the closed position. An airtight seal may be created by the seal 220 responsive to a threshold sealing force being applied against the sealing portion 223 (e.g., by the door actuator, by the load port frame 224, etc.).

The sealing surface 224A of the load port frame 224 may exert a reaction force 227 against a surface of the sealing component 223. The reaction force 227 may be normal to a plane of the sealing surface 224A and may be substantially equivalent to the threshold sealing force. The threshold sealing force may be applied substantially perpendicular to a plane of the surface 210A. In some embodiments, to create the airtight seal, the sealing force applied is between approximately 50 to 210 Newtons of force. In some embodiments, the sealing force applied is between approximately 70 and 130 Newtons. In some embodiments, the sealing force applied is less than a maximum force that can be applied to the load port door 210 by a door actuator (not illustrated). To create the airtight seal, a sealing force greater than a threshold sealing force may be applied.

In some embodiments, at least a portion of the seal 220 may flex when the sealing force is applied. In some embodiments, the sealing portion 223 and/or the base portion 222 at least partially flexes when the sealing force is applied. In some embodiments, the sealing portion 223 at least partially flexes when the sealing force is applied so the slanted tip of the sealing portion 223 can engage with the sealing surface 224A. In some embodiments, when the load port door 210 is in a closed position, the slanted tip of the sealing portion 223 forms a flat sealing interface with the sealing surface 224A to form the airtight seal. In some embodiments, the slanted tip is displaced between approximately 0.5 mm and 1.5 mm when the threshold sealing force is applied. In some embodiments, the slanted tip is displaced approximately 1.0 mm when the threshold sealing force is applied. The airtight seal may inhibit the flow of fluid (e.g., gas, air, nitrogen, etc.) and contaminants (e.g., particles, etc.) between the interface of the load port door 210 and the load port 224.

Figure 4:
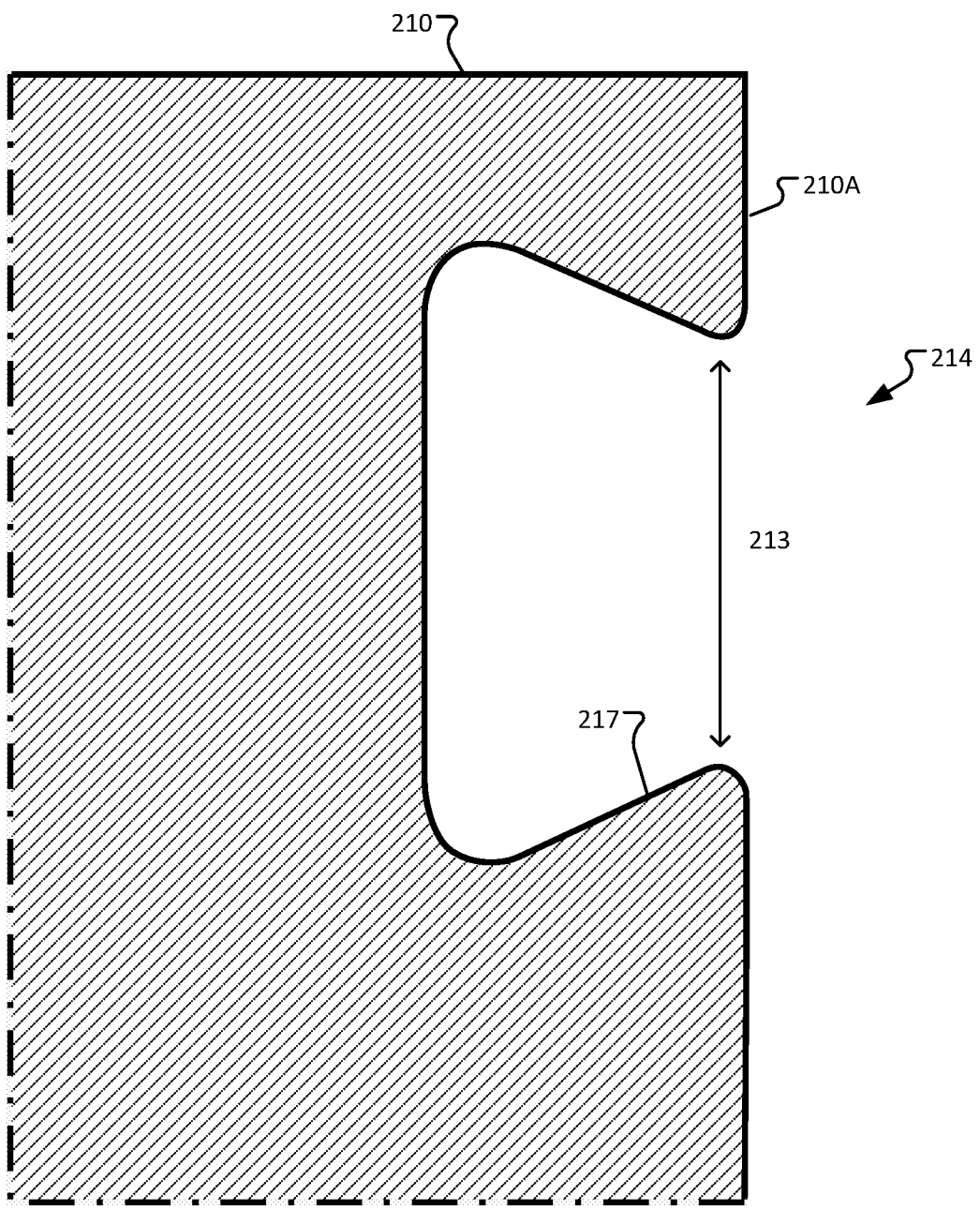
FIG. 4 is a cross section view of an example load port door, according to aspects of the present disclosure.

FIG. 4 is a cross section view of an example load port door 210, according to aspects of the present disclosure. In some embodiments, groove 214 is a dovetail groove formed in surface 210A. Groove 214 may be configured to accept base portion 222 of seal 220. In some embodiments, groove 214 may be an interface to couple the seal 220 to the load port door 210. Groove 214 may include two sidewalls 217 and a bottom wall. In some embodiments, groove 214 may be cut in the surface 210A around the perimeter of the load port door 210. Groove 214 may be cut by a dovetail milling cutter. In some embodiments, groove 214 is configured to receive standard-sized o-rings common in the industry.

In some examples, groove 214 has a depth of between approximately 1.5 mm and 2.5 mm. In some embodiments, the throat 213 of groove 214 may have a width of between approximately 2.2 mm and 3.5 mm. In some embodiments, during installation of the seal 220 into the groove 214, the notch 226 causes the base portion 222 to flex so that the base portion 222 can fit through the throat 213. In some embodiments, the maximum width of groove 214 is greater than a depth of the groove 214. In some embodiments, a sidewall 217 of the dovetail groove 214 forms an angle with the surface 210A. In some examples, the sidewall 217 and the surface 210A form an angle of between approximately 45 and 80 degrees. In some examples, at least one sidewall forms an angle relative to the surface 210A. It is to be understood by a person of ordinary skill in the art that the groove 214 may have differing dimensions than described herein to fit certain applications.

Figure 5:
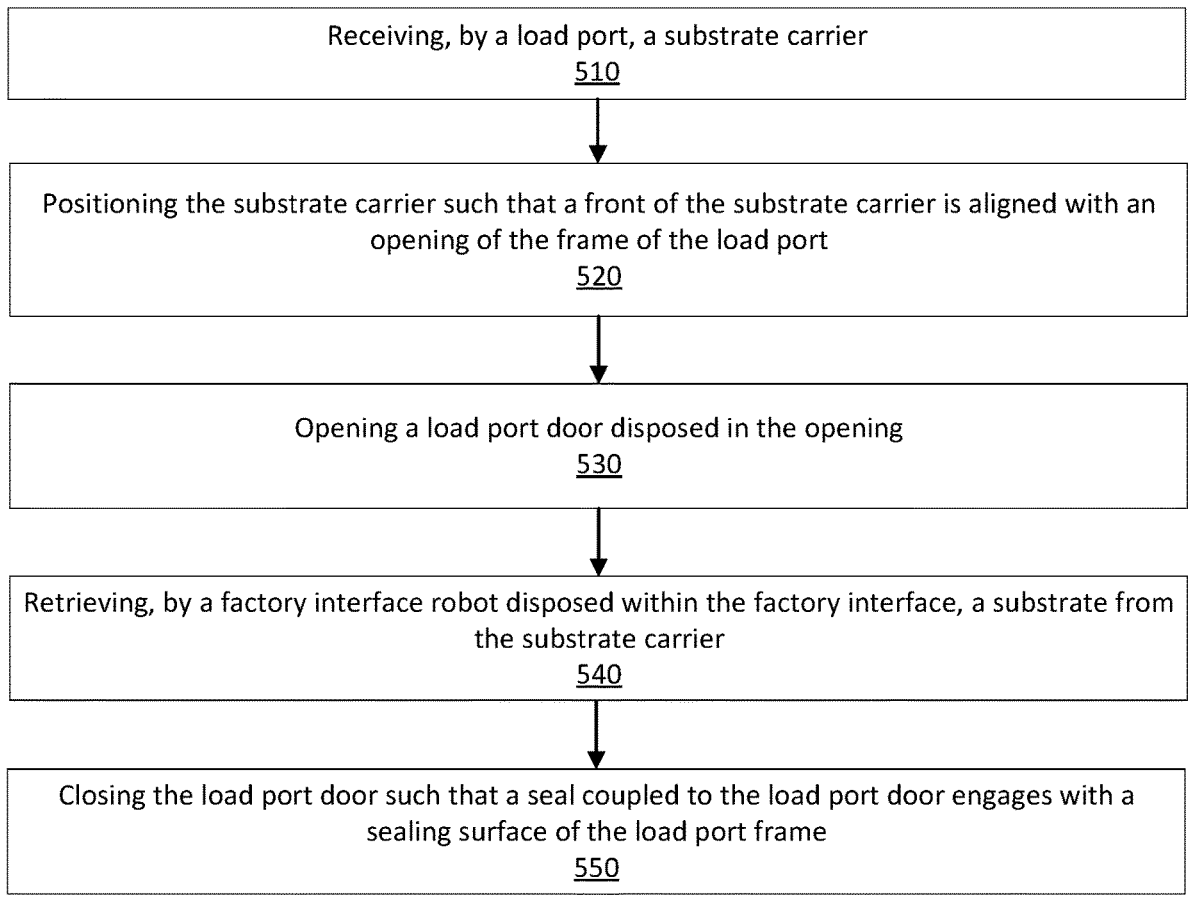
FIG. 5 is a flow chart of a method for transporting substrates from a substrate carrier to a factory interface, in accordance with embodiments of the present disclosure.

FIG. 5 is a flow chart of a method 500 for transporting substrates from a substrate carrier to a factory interface, in accordance with embodiments of the present disclosure. In some embodiments, method 500 is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500 is performed, at least in part, by an electronic device manufacturing system (e.g., an electronic device manufacturing system 100 of FIGS. 1A-1C).

For simplicity of explanation, method 500 is depicted and described as a series of operations. However, operations in accordance with this disclosure can occur in various orders and/or concurrently and with other operations not presented and described herein. Furthermore, in some embodiments, not all illustrated operations are performed to implement method 500 in accordance with the disclosed subject matter.

In addition, those skilled in the art will understand and appreciate that method 500 could alternatively be represented as a series of interrelated states via a state diagram or events.

At block 510, a load port receives a substrate carrier. In some examples, the substrate carrier is a FOUP. In some embodiments, the load port includes a frame adapted for connecting the load port to the factory interface. The frame includes a transport opening through which one or more substrates are capable of being transported between the substrate carrier and the factory interface. The load port also includes an actuator coupled to the frame and a load port door coupled to the actuator. The load port door can be configured to seal the transport opening. The actuator is capable of positioning the load port door from a closed position to an open position, and from the open position to the closed position.

The load port door can include one or more seals coupled to a surface of the load port door. A seal can include a base portion and a sealing portion extending from the base portion. The sealing portion may be configured to engage with a sealing surface of the load port frame when the load port door is in a closed position responsive to the application of a threshold sealing force against the sealing portion to create an airtight seal between the load port door and the load port frame. The base portion may be configured to couple to the load port door via a groove formed in the edge surface of the load port door. The base portion may include a notch configured to cause the base portion to flex during installation of the seal.

At block 520, the substrate carrier can be positioned such that a front of the substrate carrier is aligned with an opening of the load port frame (e.g., a transport opening).

At block 530, the load port door disposed in the opening can be opened (e.g., via a door actuator). The load port door may be moved (e.g., by the door actuator) away from the opening so that the seal coupled to the load port door disengages from the sealing surface of the load port frame. The door may then be lowered away from the opening.

At block 540, a factory interface robot disposed within the factory interface may retrieve a substrate from the substrate carrier.

At block 550, once the substrates are retrieved, the load port door can be positioned from the open position to the closed position, using the actuator, such that the seal coupled to the load port door engages the sealing surface of the load port frame to form an airtight seal. The actuator may apply a sealing force on the load port door greater in magnitude than a threshold sealing force so that the seal can create the airtight seal between the load port door and the load port frame.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A seal comprising:
   a base portion configured to couple within a groove formed in a first surface of a first component, wherein the base portion comprises a notch in a bottom of the base portion configured to cause the base portion to laterally flex responsive to an installation force; and
   a sealing portion extending from the base portion, wherein the sealing portion extends laterally offset from an end of a heel of the base portion, wherein the sealing portion comprises an at least partially curved cross-section, the at least partially curved cross-section curving in a first direction from the base portion to a segment substantially parallel with the base portion and further curving in a second direction away from the base portion, and wherein the sealing portion is configured to create an airtight seal between the first component and a sealing surface of a second component responsive to an application of a threshold sealing force against the sealing portion.

2. The seal of claim 1, wherein the first surface of the first component is substantially parallel relative to the sealing surface of the second component, and wherein the first component is moveable relative to the second component.

3. The seal of claim 1, wherein at least the sealing portion of the seal comprises a flexible elastomer material.

4. The seal of claim 1, wherein the first component is a load port door of a factory interface and the second component is a frame of a load port comprising an opening to receive the load port door, wherein the load port door moves to a closed position responsive to application of the threshold sealing force against the sealing portion, and wherein the threshold sealing force is applied substantially perpendicular to a plane of the first surface of the first component.

5. The seal of claim 1, wherein the threshold sealing force is approximately 50 to 210 Newtons.

6. The seal of claim 1, wherein the sealing portion extends from a heel of the base portion on a first side of the base portion opposite the notch.

7. The seal of claim 1, wherein the sealing portion comprises a slanted tip configured to form a flat sealing interface between the sealing portion and the sealing surface of the second component responsive to the application of the threshold sealing force.

8. The seal of claim 1, wherein the sealing portion is configured to at least partially flex responsive to the threshold sealing force applied at a distal end of the sealing portion.

9. The seal of claim 1, wherein at least a portion of the groove formed by the first surface of the first component is a dovetail groove having two sidewalls and a bottom wall, wherein a maximum width between the two sidewalls is greater than a depth of the dovetail groove.

10. A load port door comprising: an exterior surface;
an interior surface comprising a groove formed in the interior surface; and a seal coupled to the groove, wherein the seal comprises:
a base portion configured to couple within the groove, wherein the base portion comprises a notch in a bottom of the base portion configured to cause the base portion to laterally flex responsive to an installation force; and
a sealing portion extending from the base portion, wherein the sealing portion extends laterally offset from an end of a heel of the base portion wherein the sealing portion comprises an at least partially curved cross-section, the at least partially curved cross-section curving in a first direction from the base portion to a segment substantially parallel with the base portion and further curving in a second direction away from the base portion, and wherein the sealing portion is configured to create an airtight seal between the load port door and a sealing surface of a frame of a load port responsive to an application of a threshold sealing force against the sealing portion.

11. The load port door of claim 10, wherein the interior surface of the load port door is configured to be substantially parallel relative to the sealing surface of the frame of the load port, and wherein the load port door is configured to be moveable relative to the frame of the load port.

12. The load port door of claim 10, wherein at least the sealing portion of the seal comprises a flexible elastomer material.

13. The load port door of claim 10, wherein the threshold sealing force is approximately 50 to 210 Newtons, and wherein the threshold sealing force is applied substantially perpendicular to a plane of the interior surface.

14. The load port door of claim 10, wherein the sealing portion extends from a heal of the base portion on a first side of the base portion opposite the notch.

15. The load port door of claim 10, wherein the sealing portion comprises a slanted tip configured to form a flat sealing interface between the sealing portion and the sealing surface of the frame of the load port responsive to the application of the threshold sealing force.

16. The load port door of claim 10, wherein the sealing portion is configured to at least partially flex responsive to the threshold sealing force applied at a distal end of the sealing portion.

17. A load port for receiving a substrate carrier comprising:
a frame adapted for connecting the load port to a factory interface, the frame comprising a transport opening through which one or more substrates are transportable between the substrate carrier and the factory interface;
a load port door configured to substantially fill the transport opening, wherein the load port door comprises a first surface forming a groove; and
a seal coupled to the groove formed in the first surface of the load port door, wherein the seal comprises:
a base portion, wherein the seal is coupled to the groove of the load port door via the base portion, and wherein the base portion comprises a notch in a bottom of the base portion configured to cause the base portion to laterally flex responsive to an installation force; and
a sealing portion extending from the base portion, wherein the sealing portion is configured to create an airtight seal between the load port door and a sealing surface of the frame responsive to an application of a threshold sealing force against the sealing portion.

18. The load port of claim 17, wherein the sealing portion comprises a serpentine cross-section cantilevered from a first side of the base portion opposite the notch, and wherein the sealing portion is configured to at least partially flex responsive to the threshold sealing force applied at a distal end of the sealing portion.

19. The load port of claim 17, wherein the sealing portion comprises a slanted tip configured to form a flat sealing interface between the sealing portion and the sealing surface of the frame responsive to the application of the threshold sealing force.

20. The load port of claim 17, wherein the threshold sealing force is approximately 50 to 210 Newtons, and wherein the threshold sealing force is applied substantially perpendicular to a plane of the first surface of the load port door.

* * * * *